Patented July 5, 1949

2,474,893

UNITED STATES PATENT OFFICE 2,474,893

PHTHALAMIDIC ACID COMPOUNDS OF PYRIDINE AND THEIR SALTS

Harris L. Friedman and Alexander V. Tolstoouhov, New York, N. Y., assignors to Pyridium Corporation, Yonkers, N. Y., a corporation of New York No Drawing. Application September 18, 1945, Serial No. 617,172

5 Claims. (Cl. 260—296)

Our invention relates to and has for its object, a group of new chemical compounds which are more stable than the original base and hence are useful as intermediates in the production of dyes and other compounds, and some of which have therapeutic properties and are useful for devitalizing bacteria and rendering them harmless or innocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and their decomposition products may be toxic and deleterious, and their acid salts are generally too acid for injection purposes.

One of the objects of our invention, therefore, is to produce new compounds which, while possessing therapeutic properties, will have none of the mentioned, and other disadvantages of the corresponding basic compounds.

We have found that phthalamidic acid derivatives of these basic compounds possess higher therapeutic values than their corresponding basic compounds.

These therapeutic compounds of our invention are dry, stable powders and hence they can be administered in combination with food, in capsules, in table form, or their alkali metal salts may be parenterally injected in the form of an aqueous solution, and they, therefore, possess highly valuable physical, stable and administrative properties as compared with their corresponding basic compounds.

We have found further, that these therapeutic compounds of our invention are particularly valuable in their effectiveness against Mycobacterium tuberculosis, although their usefulness is not limited to that particular disease, and that this effectiveness in the treatment of disease is greater than that possessed by the corresponding basic compounds.

We have found further, that these therapeutic compounds of our invention, are less toxic than the corresponding basic compounds, and that they also possess the additional unexpected property of being practically unaffected in their antibacterial action in the presence of such biological inhibitory substances as p-aminobenzoic acid, peptones, serum, pus, etc., which are present in living organisms, which substances seriously reduce the effectiveness of other compounds.

This action of these therapeutic compounds of our invention against Mycobacterium tuberculosis is particularly unexpected and remarkable as they are relatively without effect against other pathogenic organisms such as E. coli., Staphylococcus aureus and Streptococcus pyogenes.

Further, substances which were hitherto known to have activity against Mycobacterium tuberculosis, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue breakdown, play a very important role in the inhibition of sulfonamide and sulfone compounds, and as a result of this inhibitory mechanism, therapeutic trials on the whole failed.

The activity of therapeutic compounds of our invention against Mycobacterium tuberculosis is not diminished, when p-aminobenzoic acid, peptones, serum, pus, etc., are present. We have found that these compounds of our invention inhibit the growth of various strains of tuberculosis organisms in various dilutions, some diluted as high as one part to 25 millions, depending upon the medium and strain of tuberculosis organism used.

As these inhibitory substances are present in the tubercular host, it is impossible to produce the desired therapeutic effect with sulfonamide and sulfone compounds, and hence any compounds which would practically retain their bacteriostatic properties irrespective of the inhibitory substances present would be of the highest value.

This property of the therapeutic compounds included within our invention of being practically uninhibited in bacteriostatic effectiveness, and especially in bacteriostatic effect against Mycobacterium tuberculosis, is entirely unexpected and cannot be predicated upon any prior knowledge relative to previously known bacteriostatic compounds, and is of the greatest importance and value in the treatment of infection.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The general formula of the compounds of our invention is

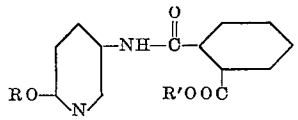

in which R represents a member of the group of alkyl radicals and alkyl ether radicals having not more than eight carbon atoms such as ethyl-, propyl-, butyl-, amyl-, hexyl-, heptyl-, octyl-, isopropyl-, isobutyl-, secondary butyl-, tertiary butyl-, isoamyl-, diethylmethyl-, dipropylmethyl-, allyl, methoxyethyl-, ethoxyethyl-, and butoxyethyl-, and aryl radicals such as phenyl-, naphthyl-, benzyl-, betapyridyl-, furfuryl-, p-aminophenyl-, p-aminobenzyl-, cyclohexyl-, tetrahydrofurfuryl-, phenyloxyethyl-, and benzyloxyethyl-, and R' is hydrogen or an alkali metal.

These compounds are N-(2-R-oxy-pyridyl-5-phthalamidic acid and its alkali metal salts.

The chemical reaction of the process is the following:

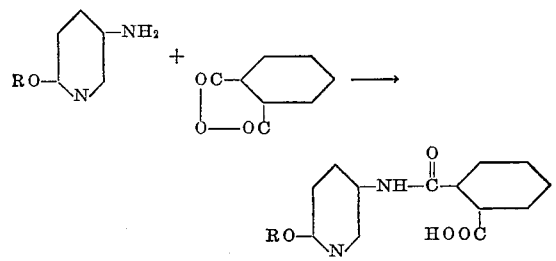

in which R is a member of the group consisting of alkyl radicals and alkyl ether radicals having not more than eight carbon atoms and aryl radicals.

In producing our new compounds we react the free amine dissolved in alcohol, or other suitable inert solvent, with phthalic anhydride to obtain the free phthaloyl amide. The alkali metal salts of these are made by dissolving the amine in a solution containing equimolecular quantities of alkali metal hydroxides or carbonates.

The following are examples of our processes for the production of the indicated compounds of our invention.

*Example I*

Two and seventy-six hundredths grams of 2-ethoxy, 5-aminopyridine and 4.34 grams of phthalic anhydride were dissolved in 50 ccs. of methanol and refluxed for 5 minutes. The solution was then cooled and the crystals collected on a filter. The crude material was recrystallized from 100 ccs. of methanol. This material was placed into 100 ccs. of a 4% solution of sodium hydroxide, the insoluble impurities filtered off and then reprecipitated by acidifying to pH 2.5 with hydrochloric acid. The crystals were collected on a filter, washed with water, and dried. This product, 2-ethoxy, 5-phthaloylaminopyridine is very soluble in water in the form of its alkali metal salts. The melting point of the product is 248–248.5° C.

*Example II*

Fifty-three grams of 2-butoxy, 5-aminopyridine and 71 grams of phthalic anhydride were put into 500 ccs. absolute ethanol and refluxed for half an hour. The clear, amber colored solution was cooled, the crystalline product collected on a filter and recrystallized from 1200 ccs. methanol and dried. This was dissolved in dilute sodium hydroxide solution, the insoluble impurities filtered off and the product precipitated by acidifying to pH 3.0. This precipitate was collected on a filter, washed with water, dried and recrystallized from methanol. The product so prepared, 2-butoxy, 5-phthaloylaminopyridine forms white crystals which melt at 159–159.5° C. The alkali metal salts of the compound are very soluble in water.

*Example III*

Three and nine-tenths grams of 2-hexyloxy, 5-aminopyridine and 4.34 grams phthalic anhydride were refluxed in 50 ccs. of methanol for 5 minutes. After cooling, the white precipitate was collected on a filter and recrystallized from 25 ccs. methanol. The product, 2-hexyloxy, 5-phthaloylaminopyridine forms white crystals the alkali metal salts of which are soluble in water. The melting point of the product is 156.5–157° C.

*Example IV*

Six and seven-tenths grams of 2-octyloxy, 5-aminopyridine and 6.7 grams of phthalic anhydride were refluxed in 80 ccs. of methanol for half an hour then 60 ccs. more methanol were added and boiled. The solution was filtered and on cooling white crystals came out. The product, 2-octyloxy, 5-phthaloylaminopyridine was recrystallized from methanol and the alkali metal salts are soluble in water. The melting point of the product is 148–149° C.

*Example V*

One and eight-tenths grams of 2-isoamyloxy, 5-aminopyridine and 1.22 grams of phthalic anhydride were refluxed in 50 ccs. of methanol for about 30 minutes. On cooling, white, fluffy crystals came out which were collected on a filter, washed with methanol and dried. The product, 2-isoamyloxy, 5-phthaloylaminopyridine was recrystallized twice from methanol and the alkali metal salts are soluble in water. It melts at 160.5–161° C.

*Example VI*

Two and one-tenth grams of 2-allyloxy, 5-aminopyridine and 3 grams of phthalic anhydride were refluxed for half an hour. On cooling, copious, long, cotton-like needles came out, which were collected on a filter, washed and dried. The dried product was dissolved in dilute sodium hydroxide solution and precipitated out with excess hydrochloric acid. The precipitate was collected and recrystallized from 30 ccs. methanol. The product, 2-allyloxy, 5-phthaloylaminopyridine forms long white needles, the alkali metal salts of which are soluble in water. The melting point is 181–181.5° C.

*Example VII*

Four and eight-tenths grams of 2-methoxyethoxy, 5-aminopyridine and 4 grams of phthalic anhydride were refluxed in 50 ccs. absolute ethanol for one and a half hours. After cooling, the separated crystals were collected on a filter, washed and dried. The dried material was recrystallized from 300 ccs. methanol. The product, 2 - methoxyethoxy, 5 - phthaloylaminopyridine forms white, cotton-like needles, the alkali metal salts of which are soluble in water. Its melting point is 162-163° C.

*Example VIII*

Five and fifty-eight hundredths grams of 2-phenyloxy, 5-aminopyridine and 6.66 grams phthalic anhydride were refluxed in 200 ccs. of methanol for 5 hours. After cooling, white needles came out which were collected and recrystallized from methanol as in the previous examples. The alkali metal salts are soluble in water and the product 2-phenyloxy, 5-phthaloylaminopyridine melts at 192-193° C.

*Example IX*

Three and four-tenths grams of 2-tetrahydrofurfuryloxy, 5-aminopyridine and 8 grams of phthalic anhydride were refluxed in 50 ccs. absolute ethanol until complete solution was obtained. The solution was cooled and the separated crystals were collected and recrystallized from methanol. The white crystalline product is 2-tetrahydrofurfuryloxy, 5-phthaloylaminopyridine and its alkali metal salts are soluble in water, the melting point of which is 161.5–162.5° C.

The activity of some of the compounds included in our invention against Mycobacterium tuberculosis are tabulated below. The figures indicate the highest dilution that still inhibits the growth of Mycobacterium tuberculosis under a particular set of experimental conditions as regards inoculum, culture, etc., thereby making a comparable series.

| Name of compound | Highest dilution showing bacteriostasis |
|---|---|
| 2-ethoxy, 5-phthaloylaminopyridine | 0 |
| 2-butoxy, 5-phthaloylaminopyridine | 1/800,000 |
| 2-hexyloxy, 5-phthaloylaminopyridine | 1/800,000 |
| 2-octyloxy, 5-phthaloylaminopyridine | 1/25,000 |
| 2-isoamyloxy, 5-phthaloylaminopyridine | 0 |
| 2-allyloxy, 5-phthaloylaminopyridine | 1/50,000 |
| 2-methoxyethoxy, 5-phthaloylaminopyridine | 1/25,000 |
| 2-phenyloxy, 5-phthaloylaminopyridine | 0 |
| 2-tetrahydrofurfuryloxy, 5-phthaloylaminopyridine | 1/25,000 |

The products as described in the foregoing examples are similar in their characteristics; they are generally white crystalline or powder in form; their alkali metal salts are all soluble in water and no free amine is present.

The therapeutic compounds of our invention, therefore, present highly valuable and unexpected bacterio-static properties especially against such bacteria as cause tubercular infections, although their usefulness is not limited to that particular disease.

We do not limit ourselves to the specific limitations mentioned, as these are given solely for the purpose of clearly describing our invention as set forth herein.

What we claim is:

1. Compounds having the general formula:

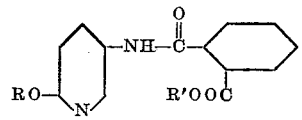

in which R is a member of the group consisting of alkyl radicals and alkyl ether radicals having not more than eight carbon atoms and aryl radicals, and in which R' is a member of the group consisting of hydrogen and alkali metals.

2. Compounds having the general formula:

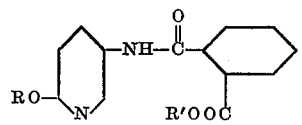

in which R is an alkyl radical having not more than eight carbon atoms, and in which R' is a member selected from the group consisting of hydrogen and alkali metals.

3. 2-butoxy, 5-phthaloylaminopyridine and its alkali metal salts.

4. 2-hexyloxy, 5-phthaloylaminopyridine and its alkali metal salts.

5. 2-allyloxy, 5-phthalolyaminopyridine and its alkali metal salts.

HARRIS L. FRIEDMAN.
ALEXANDER V. TOLSTOOUHOV.

No references cited.